United States Patent [19]
Fowler et al.

[11] Patent Number: 5,574,594
[45] Date of Patent: Nov. 12, 1996

[54] AUTOMATED MICROSCOPE SLIDE MARKING DEVICE

[75] Inventors: Whitson Fowler, Halesite; Merrill Brenner, Baldwin; Melina Vratny, Lake Ronkonkoma, all of N.Y.

[73] Assignee: Nikon Inc., Melville, N.Y.

[21] Appl. No.: 147,990

[22] Filed: Nov. 5, 1993

[51] Int. Cl.⁶ .......................... G02B 21/26; G02B 21/00; G01D 15/16
[52] U.S. Cl. .................. 359/391; 359/368; 346/140.1
[58] Field of Search .......................... 359/391–398, 359/368, 381, 503; 33/547, 666, 573–579; 346/140.1

[56] References Cited

U.S. PATENT DOCUMENTS

| | | | |
|---|---|---|---|
| 3,721,170 | 3/1973 | Johnson | 359/503 |
| 3,827,777 | 8/1974 | Ford | 359/391 |
| 3,837,731 | 9/1974 | Amos et al. | 359/656 |
| 4,262,426 | 4/1981 | Miyazaki | 359/368 |
| 4,262,989 | 4/1981 | Waters | 359/381 |
| 4,400,708 | 8/1983 | Sachs | 346/140.1 |
| 4,690,521 | 9/1987 | Saccomanno | 359/368 |
| 4,807,979 | 2/1989 | Saccamanno et al. | 359/368 |
| 5,076,679 | 12/1991 | Hervas | 359/381 |
| 5,331,458 | 7/1994 | Bacchi et al. | 359/391 |

FOREIGN PATENT DOCUMENTS 281473  10/1993  Japan ................. 359/391

*Primary Examiner*—Thong Nguyen
*Attorney, Agent, or Firm*—Klauber & Jackson

[57] ABSTRACT

An automated microscope slide marking device 10 for making reference marks on the surface of microscope slides 90. The slides 90 are marked by placing a remote push-button 14 or foot-switch 32 at an ergonomically desirable position for a microscope user. When either the push-button 14, or the foot-switch 32, is engaged by the user, a solenoid coil in an electrical actuator 26 is energized. This actuator 26 controls the movement of a plastic fiber 62 through an ink well 56 and through a thin needle-like tube 58, which is directed toward the surface of the slide 90. Thus, when the actuator 26 is energized, the plastic fiber 62 protrudes from the end of the tube 58 so as to come into contact with the surface of the slide 90 and make a reference mark thereon.

22 Claims, 7 Drawing Sheets

AUTOMATED MICROSCOPE SLIDE MARKING DEVICE

BACKGROUND OF THE INVENTION

1. Field of the Invention

The present invention relates to scanning and marking microscope slides and, more particularly, to an automated microscope slide marking device which allows a microscope user to automatically mark a microscope slide at a particular point of interest so as to assist the user in later recalling the marked slide location for further viewing. Such an automated microscope slide marking device also allows slide marking to be standardized within a laboratory.

2. Description of the Prior Art

In a cytology laboratory, a cytotechnologist examines numerous specimen slides under a microscope in order to analyze certain specimen cells of questionable nature. When such suspect cells are located, the cytotechnologist generally marks the slide at that point so that he or she may recall the location of the cells at some later time for further examination. To date, cytotechnologists have marked slides by using one of several manual methods.

One such method exists where a cytotechnologist marks the area of the microscope slide in question with a flair tip marking pen. To accomplish this, the cytotechnologist must take his or her eyes away from the eyepiece of the microscope, move the microscope objective out of the way, peer under the nosepiece, estimate the location of interest on the slide, and then mark the slide with the pen. This method requires the cytotechnologist to refocus his or her eyes, move his or her body into a potentially awkward position, and to make a guess as to the placement of the mark. Obviously, this method of marking is not exact and it is time consuming.

Another such method consists of marking a microscope slide by using a objective-like configuration marker. In this method, the cytotechnologist must take his or her eyes away from the microscope eyepiece, rotate the microscope nosepiece until the marking apparatus is in place, and then physically push the marking apparatus down onto the slide in order to mark the area in question. This method requires the cytotechnologist to refocus his or her eyes and to move his or her body into a potentially awkward position. Although this method is more exact than the previously described method, it is no less tedious or less time consuming.

In addition to the methods just described, several patents have been directed toward devices for marking microscope slides. For example, in U.S. Pat. Nos. 4,807,979 by Saccomanno et al, 4,690,521 by Saccomanno, 4,262,426 by Miyazaki, and 3,827,777 by Ford, devices are disclosed for marking microscope slides. A brief description of each of these devices will now be given.

In U.S. Pat. Nos. 4,807,979 and 4,690,521, similar marking devices are disclosed of which both contain a marking assembly that is equipped with a plunger assembly that works in conjunction with a replaceable ink cartridge in order to place a reference mark upon a microscope slide surface. The marking assembly in both of these patents is activated when the user manually engages the plunger assembly so that the ink cartridge places an ink mark on the slide under examination.

In U.S. Pat. No. 4,262,426, a marker assembly is disclosed comprising a cylindrical support, fitted around the barrel of a microscope objective lens, having a housing integrated therein for holding a shaft with an associated marking member. The shaft, and hence the associated marking member, are manually maneuvered by the user to perform the marking function after ink has been liberally applied thereto.

Lastly, in U.S. Pat. No. 3,827,777, a marking device is snapped onto a microscope objective by way of a split ring made of spring metal. Attached to the split ring are a pair of wire members that support a corresponding pair of marker elements. The marker elements are equipped with pads that are capable of holding ink or some other type of marking fluid. To mark a microscope slide, the objective, and hence the marker elements, are manually moved toward the slide so that contact is made therebetween and a mark is made thereon.

Although all of the above-mentioned prior art methods and devices allow microscope slides to be marked for purposes of recalling the marked slide location later for further viewing, none allow such marking to be performed automatically so as to relieve the user from potentially awkward body positions. Furthermore, several of the above-described techniques require the user to lose sight of the particular slide location of interest during the marking process, thereby introducing the risk of making an inaccurate mark. It is therefore desirable to overcome the shortcomings of the above-mentioned prior art in these areas, while providing a convenient and practical means for automatically marking microscope slides.

SUMMARY OF THE INVENTION

The present invention contemplates an automated microscope slide marking device which allows a microscope user to automatically mark a microscope slide at a particular point of interest so as to assist the user in recalling the marked slide location later for further viewing. Such a device allows a glass microscope slide to be marked with ink of varying colors without requiring the user to move into potentially awkward positions. This is accomplished by placing a remote push-button or foot-switch at an ergonomically desirable position for the user. When the push-button, or the foot-switch, is activated by the user, a solenoid coil in an electrical actuator is energized. This actuator controls the movement of a plastic fiber through an ink reservoir and through a thin needle-like tube, which is directed toward the surface of the slide. Thus, when the actuator is energized, the plastic fiber protrudes from the end of the tube so as to come into contact with the surface of the slide and deposit an ink spot thereon.

The present invention automated microscope slide marking device is to be used in laboratories where marking specific areas, or cells, on a microscope slide is required. This automated slide marking device reduces the tedium of manually locating and marking the areas, or cells, with marking pens or other means. With the automated slide marker, the task of slide marking can be accomplished with the touch of a button, or switch, without the user having to remove his or her eyes from the microscope eyepiece. Furthermore, slide marking practices can be standardized within a laboratory location through (1) marking size; (2) marking location with respect to a cell; and (3) marking color.

From the above descriptive summary it is apparent how the present invention automated microscope slide marking device overcomes the shortcomings of the above-mentioned prior art.

Accordingly, the primary objective of the present invention is to provide a convenient, comfortable, and practical means for automatically marking microscope slides.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENTS OF THE PRESENT INVENTION

Figure 1:
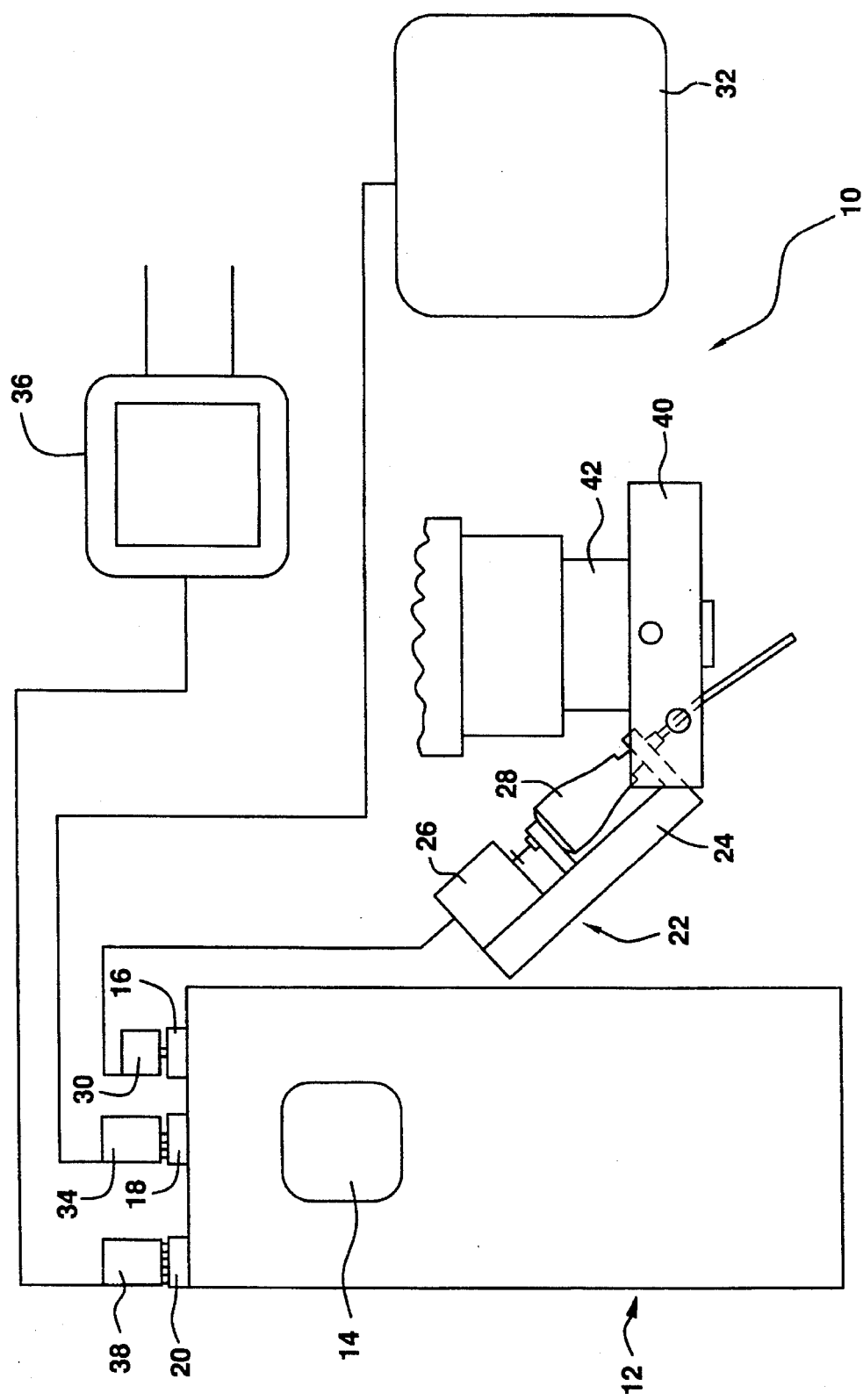
FIG. 1 is a schematic diagram of the present invention automated microscope slide marking device.

Referring to FIG. 1, there is shown an arrangement of the component parts of the present invention automated microscope slide marking device 10. Included in this arrangement is a switching module 12 having a push-button 14 and three separate electrical sockets 16,18,20, an electronic marker assembly 22 having a support 24, an electrical actuator 26 secured to the support 24, a needle marker cartridge 28 also secured to the support 24, and an electrical plug 30 for making an electrical connection between the electrical actuator 26 to the first 16 of the electrical sockets of the switching module 12, a foot-switch 32 having an electrical plug 34 for making an electrical connection to the second 18 of the electrical sockets of the switching module 12, an AC to DC wall plug voltage transformer 36 having an electrical plug 38 for making an electrical connection to the third 20 of the electrical sockets of the switching module 12, and a ring adapter 40 which is designed to fit around the barrel of a microscope objective 42 and to secure the electronic marker assembly 22 thereto. As will now be described, these component parts work in combination to allow a microscope user to automatically mark the surface of a microscope slide.

Figure 2:
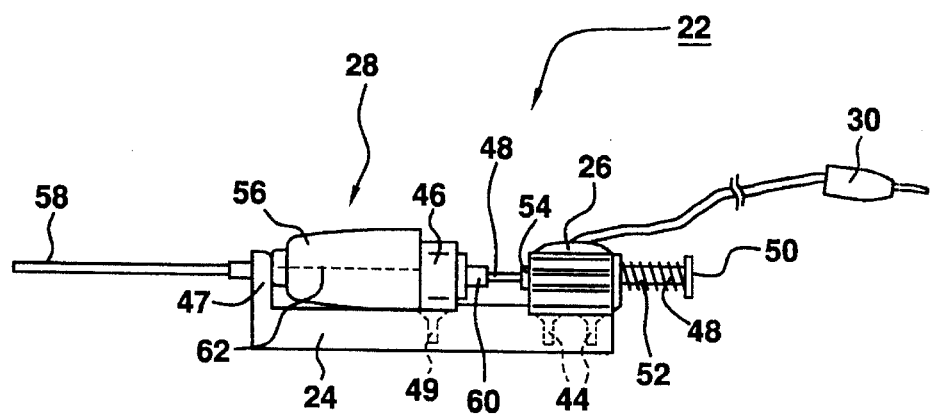
FIG. 2 is a side view of the electronic marking assembly used in the present invention automated microscope slide marking device shown in FIG. 1.

Referring to FIG. 2, there is shown a side view of the electronic marker assembly 22 with the electrical actuator 26 and the needle marker cartridge 28 secured thereto. At this point it should be noted that the electronic marker assembly 22 is a component part which can be supplied by Xandex, Inc., of Petaluma, Calif.

Figure 3:
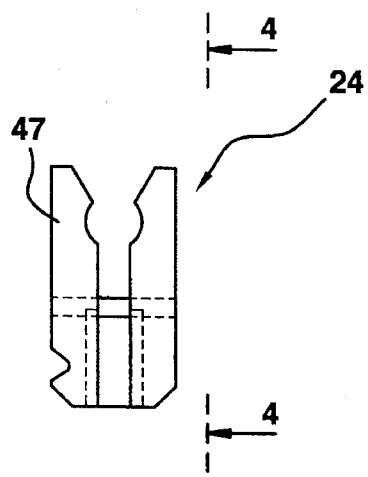
FIG. 3 is an end view of the support used in the electronic marking assembly shown in FIG. 2, taken along line 3—3 of FIG. 4.
Figure 4:
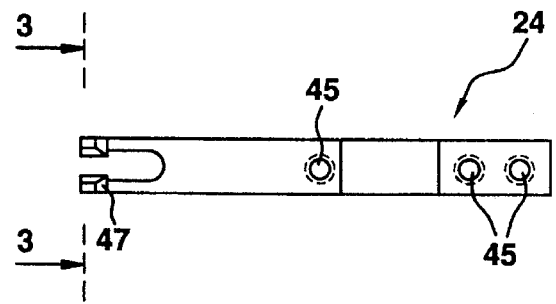
FIG. 4 is a top view of the support used in the electronic marking assembly shown in FIG. 2, taken along line 4—4 of FIG. 3.
Figure 5:
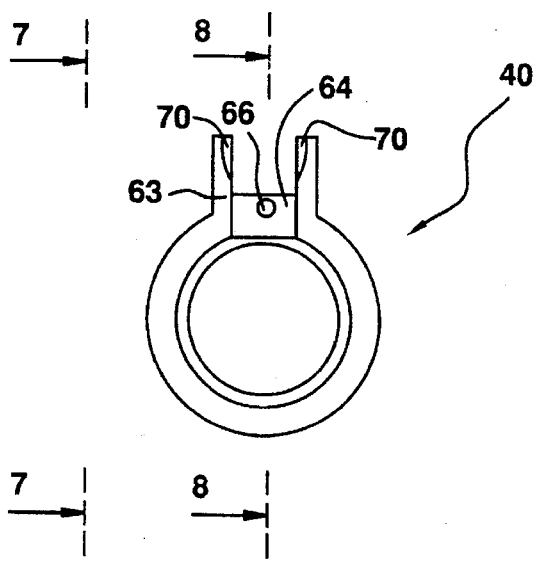
FIG. 5 is a top view of the ring adapter used in the present invention automated microscope slide marking device shown in FIG. 1, taken along line 5—5 of FIG. 7.
Figure 6:
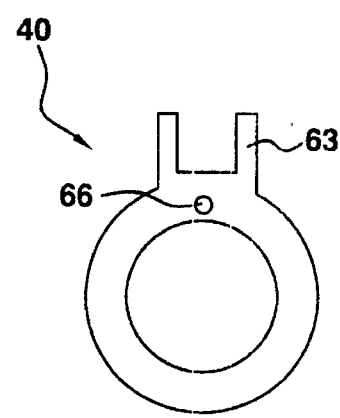
FIG. 6 is a bottom view of the ring adapter used in the present invention automated microscope slide marking device shown in FIG. 1, taken along line 6—6 of FIG. 7.
Figure 7:
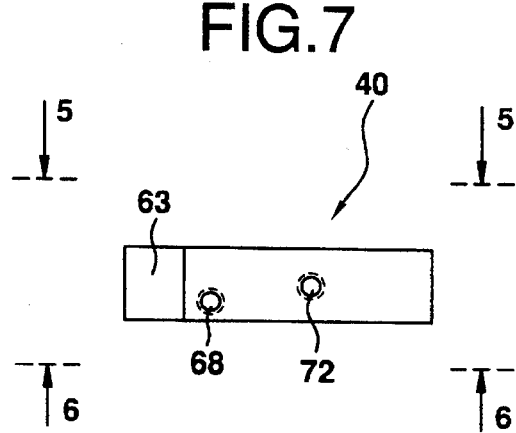
FIG. 7 is a side view of the ring adapter used in the present invention automated microscope slide marking device shown in FIG. 1, taken along line 7—7 of FIG. 5.
Figure 8:
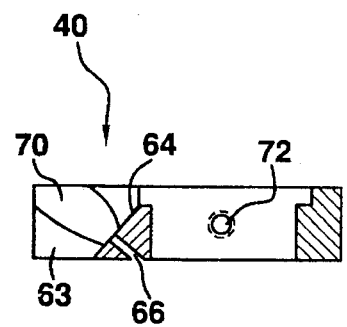
FIG. 8 is a side cross-sectional view of the ring adapter used in the present invention automated microscope slide marking device shown in FIG. 1, taken along line 8—8 of FIG. 5.

The design of the electronic marker assembly 22 is such that the electrical actuator 26 is secured to the support 24 with a pair of screws 44, while the needle marker cartridge 28 is held to the support 24 by way of a metal clamp 46 and a U-joint segment 47 formed within the support 24. The metal clamp 46 and the U-joint segment 47 are used so as to allow the needle marker cartridge 28 to be easily removed and replaced whenever ink, or other marking fluid which is stored therein, needs replenishing. The metal clamp 46 is secured to the support with a screw 49. Referring to FIGS. 3 and 4, an end view and a top view of the support 24 are shown, with the U-joint segment 47 and several threaded mounting holes 45 illustrated therewith. It should be noted that the support 24 may be fabricated from a variety of different rigid materials, such as metal or hard plastic.

Referring back to FIG. 2, the electrical actuator 26 is comprised of an annular solenoid coil with a metal push-pin 48 extending along the axis thereof. The metal push-pin 48 has a head 50 at one end for retaining a recoil spring 52. The recoil spring 52 forces the push-pin 48 to remain in an initial position (as shown) when the solenoid coil of the actuator 26 is not energized. Near the opposite end of the push-pin 48, on the other side of the actuator 26, a plastic retainer 54 is affixed which prevents the recoil spring 52 from forcing the push-pin 48 out from within the actuator 26. The remaining portion of the push-pin 48, from the plastic retainer 54 out to the end, is left open for connection with the needle marker cartridge 28.

The needle marker cartridge 28 is comprised of an ink well 56 with a needle-like tube 58 extending from one end and a plastic coupling 60 on the other. The plastic coupling 60, which is formed to mate with the open end of the actuator push-pin 48, is connected to a plastic fiber 62 that passes through the ink well 56 and along the needle-like tube 58. This plastic coupling 60, and hence the plastic fiber 62, are movable along the axis of the cartridge 28 so that the plastic fiber 62 can both protrude from and retreat back into the end of the needle-like tube 58. Thus, when the solenoid coil of the actuator 26 is energized, the plastic fiber 62 protrudes from the end of the needle-like tube 58 with ink from the ink well 56 adhering thereto. Such action allows the plastic fiber 62 to deposit an ink spot, or a reference mark, onto any surface which comes into contact therewith.

Referring back to FIG. 1, the solenoid coil of the electrical actuator 26 is energized when either the push-button 14 or the foot-switch 32 is engaged by the microscope user. Thus, the switching module 12 performs an ORing function between the push-button 14 and the foot-switch 32. The AC to DC wall plug voltage transformer 36 supplies the switching module 12 with a DC operating voltage. The operating voltage, typically 12 or 24 volts, allows the switching module to perform the ORing function and to energize the solenoid coil of the electrical actuator 26. The push-button 14 and the foot-switch 32 are provided to give the microscope user an option of placing, and then engaging, either at an ergonomically desirable position.

Referring to FIGS. 5, 6, 7 and 8, there are shown top, bottom, full side, and cross-sectional side views, respectively, of the ring adapter 40. To allow the electronic marker assembly 22 to be secured to the ring adapter 40, an appendage 63 is formed on the side of the ring adapter 40 having an angled groove 64 for supporting the marker assembly 22. To accommodate the needle-like tube 58 of the marker assembly, a hole 66 is bored within the angled groove 642 through to the bottom of the ring adapter 40. Thus, the needle-like tube 58 of the marker assembly is fed through the hole 66 so that the U-joint segment end of the support 24 abuts against the bottom of the angled groove 64. To secure the marker assembly 22 in this position a threaded hole 68 is bored through the side of the ring adapter 40 intersecting with hole 66. A locking thumbscrew 68 (see FIG. 7) is placed in this threaded hole 68 so as to be tightened against the needle-like tube 58. To further secure the marker assembly 22 to the ring adapter 40, a region 70 is carved within the angled groove 64 which allows the ink well 56 to fit snugly therein.

As previously described, the ring adapter 40 is designed to fit around the barrel of a microscope objective 42. To secure the ring adapter 40 to the objective barrel 42, threaded holes 72 are bored through the side of the ring adapter 40. Mounting screws 74 (see FIG. 11) are placed in these threaded holes 72 so that they may be tightened against the objective barrel 42. It should be noted that the ring adapter 40 may be fabricated from a variety of different rigid materials, such as metal or hard plastic.

Figure 9:
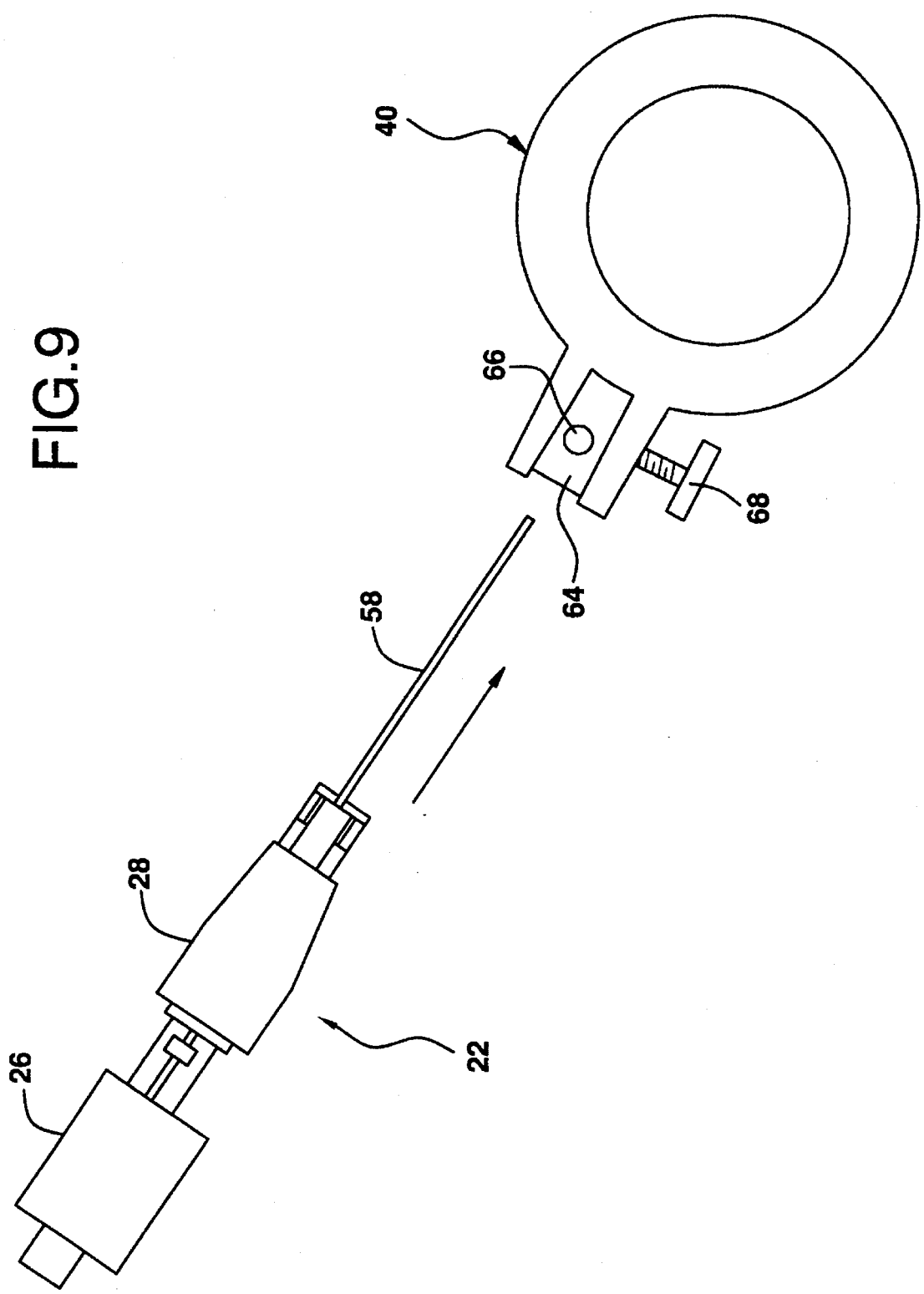
FIG. 9 is an functional view of the electronic marking assembly shown in FIG. 2 being mated with the ring adapter shown in FIG. 5.
Figure 10:
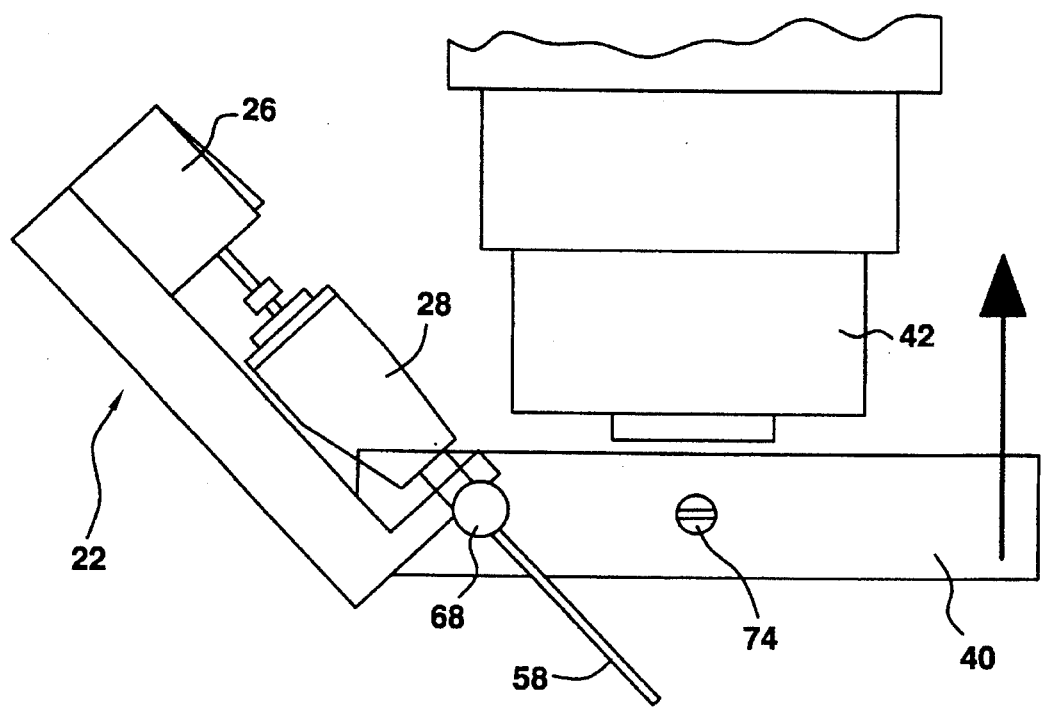
FIG. 10 is an functional view of the ring adapter shown in FIG. 5, and hence the electronic marking assembly shown in FIG. 2, being mated with a microscope objective.
Figure 11:
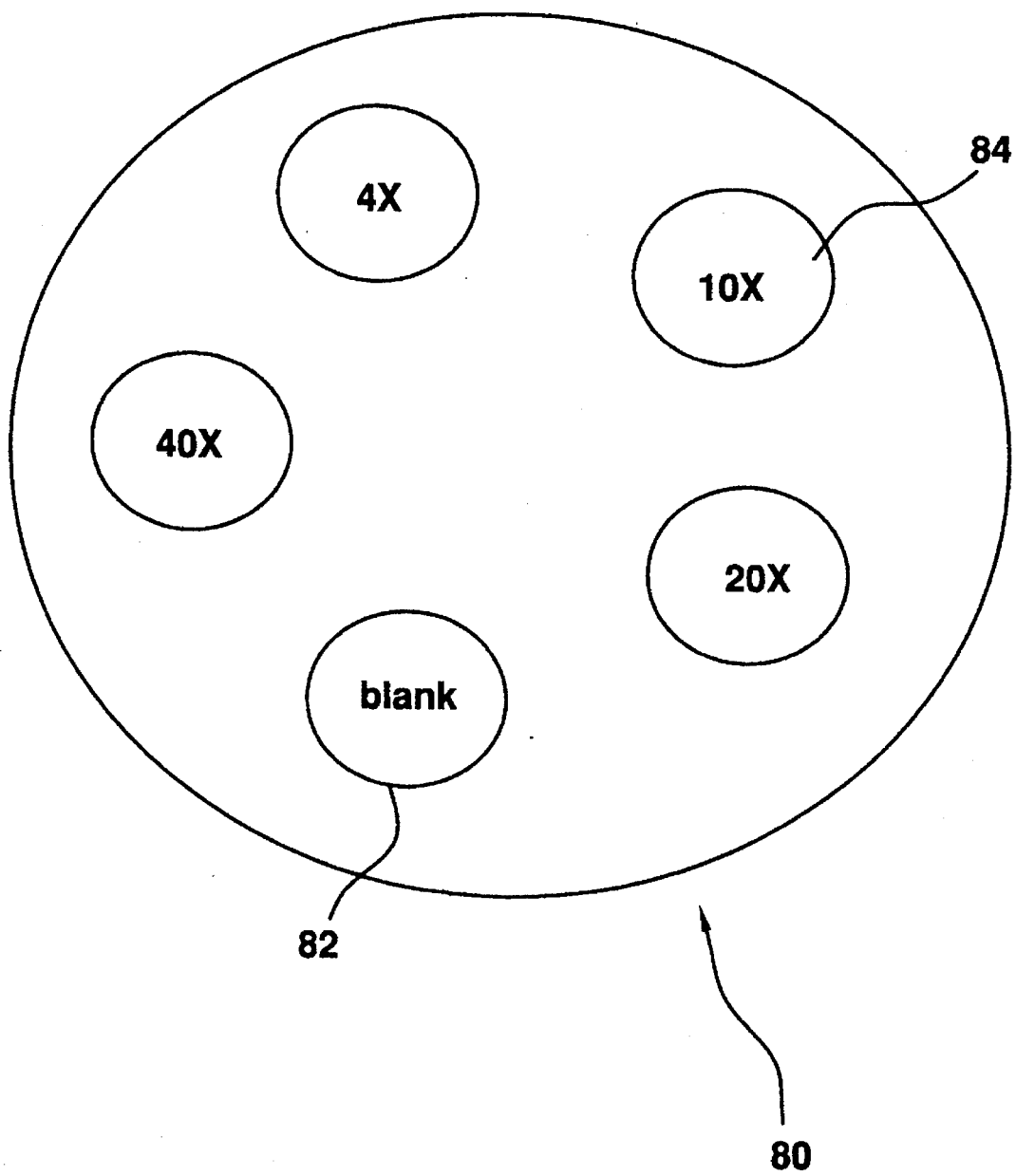
FIG. 11 is a plan view of a typical microscope nosepiece arrangement indicating a blank microscope objective location opposite the microscope objective location where the present invention automated microscope slide marking device will be mounted.

Referring to FIG. 9, the electronic marker assembly 22 is shown being directed into the angled groove 64 of the ring adapter 40, with the needle-like tube 58 being directed into hole 66. Once the electronic marker assembly 22 is positioned within the angled groove 64, it is secured by tightening the locking thumbscrew 68 against the needle-like tube 58. Referring to FIG. 10, the electronic marker assembly 22 is shown secured to the ring adapter 40, while the ring adapter 40 is being fit around the barrel of the microscope objective 42. Once the ring adapter 40 is positioned around the barrel of the microscope objective 42, it is secured in place by tightening the mounting screws 74 against the barrel 42. It should be noted that the size of the ring adapter 40 typically corresponds to the size of a E Plan LWD 10X power microscope objective barrel since it is at this power that most cytology analysis occurs. Of course, the size of the ring adapter 40 is in no way restricted to the E Plan LWD 10X power microscope objective size. It should also be noted that the collar of the microscope objective 42 must be removed before the ring adapter 40 may be affixed thereto. It should further be noted that no microscope objective can be attached to the microscope nosepiece in the objective position opposite the microscope objective 42 to which the ring adapter 40 is secured so as to allow room for the electronic marker assembly 22 to be positioned underneath the nosepiece. This is illustrated in FIG. 11, where a typical microscope nosepiece arrangement 80 is shown having an empty objective position 82 opposite from the objective position 84 where the microscope objective 42 to which the ring adapter 40, and hence the electronic marker assembly 22, are to be mounted.

Figure 12:
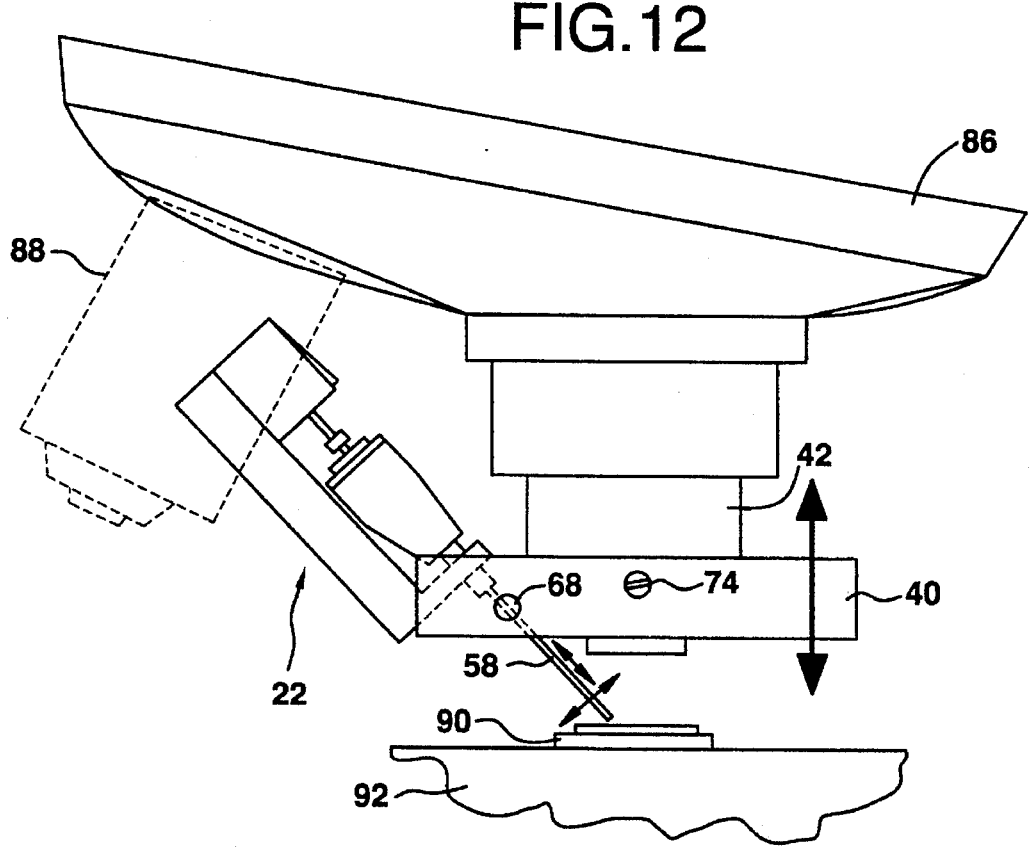
FIG. 12 is a functional view of the present invention automated microscope slide marking device being adjusted in relation to a microscope slide.

Referring to FIG. 12, the electronic marker assembly 22 is shown secured to the ring adapter 40, which itself is secured to the barrel of the microscope objective 42. Also shown is a microscope nosepiece 86, to which the microscope objective 42 is attached, along with an outline of an adjacent objective 88 so as to illustrate the typical positioning of the present invention automated microscope slide marking device 10 in an actual working environment. Also, a microscope slide 90 is shown resting upon a microscope slide base 92 so as to illustrate the spacing relationship between the needle-like tube 58 and the surface of the slide 90. The ideal position of the needle-like tube 58 with respect to the slide 90 is such that there should be approximately 1.5 mm of vertical clearance therebetween when the image viewed through the microscope is brought into focus. Furthermore, the needle-like tube 58 should not appear in the field of view, but the reference mark that is made by the plastic fiber 62 should appear at the edge of the field of view. When using an E Plan LWD 10X power microscope objective or other objectives, such can be accomplished by horizontally positioning the needle-like tube 58 approximately 1.25 mm from the center of the field of view. To achieve these vertical and horizontal distances, the ring adapter 40 can be adjusted up and down the barrel of the microscope objective 42, as indicated, and the needle-like tube 58 can be adjusted up and down the angled groove 64 through hole 66, also as indicated. These adjustments are made by simply loosening and retightening the mounting screw 74 and the locking screw 68 after the ring adapter 40 and the electronic marker assembly 22 have been repositioned, respectively. It should be noted that the needle-like tube 58 may be bent slightly, as shown, to make minor positioning adjustments.

Figure 13:
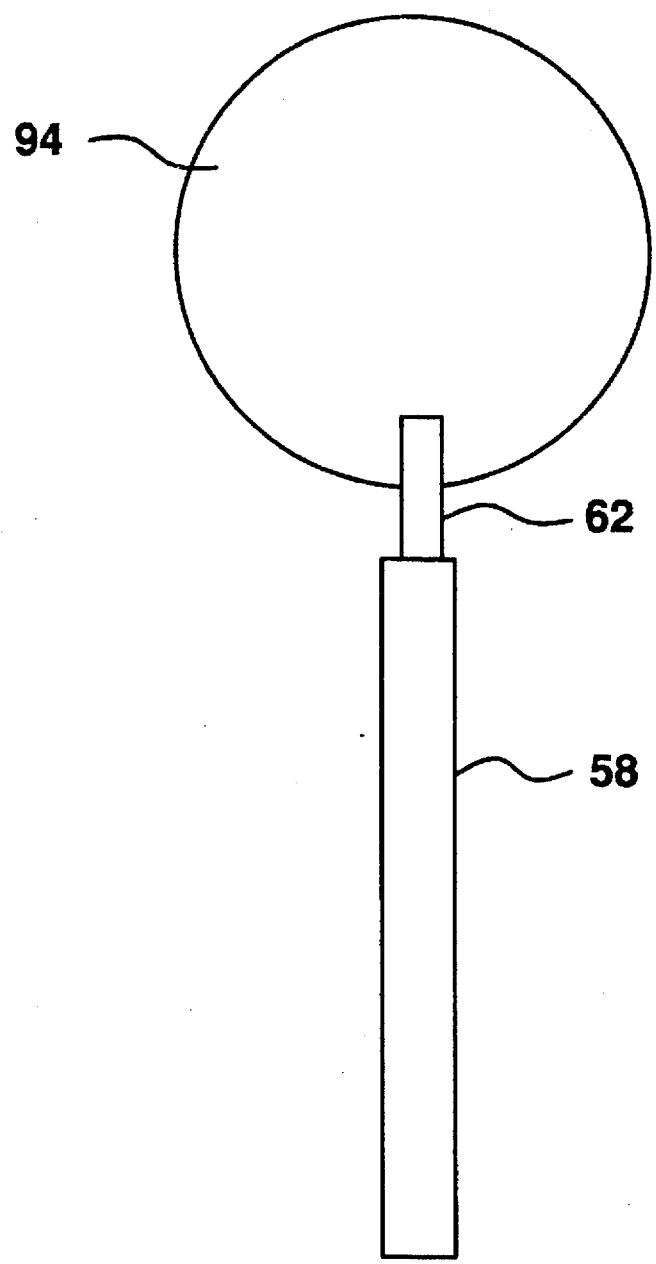
FIG. 13 is a typical field of view as seen looking through an E Plan LWD 10X power microscope objective with the present invention automated microscope slide marking device making a reference mark.

Referring to FIG. 13, a field of view outline 94 is shown for an E Plan LWD 10X power microscope objective or other LWD 10X power microscope objectives along with the needle-like tube 58 with the plastic fiber 62 protruding therefrom. The dimensions of the field of view outline 94 are given, as well as the approximate horizontal positioning of the needle-like tube 58 from the center of this field of view 94. Given these dimensions, the plastic fiber 62 should leave a reference mark approximately 0.25 mm within the field of view outline 94.

With the present invention automated microscope slide marking device 10 now fully described, it can thus be seen that the primary objective set forth above is efficiently attained and, since certain changes may be made in the above-described device 10 without departing from the scope of the invention, it is intended that all matter contained in the above description or shown in the accompanying drawings shall be interpreted as illustrative and not in a limiting sense.

What is claimed is:

1. An automated microscope slide marking device for making reference marks on a surface of a microscope slide, said device comprising:

an electronic marker assembly having a support upon which an electrical actuator and a needle marker cartridge are secured, said needle marker cartridge being comprised of an ink well with a needle-like tube extending from one end and a coupling member on the other end, said coupling member being connected to a fiber that passes through said ink well and along said needle-like tube, said coupling member and said fiber being movable along a longitudinal axis of said needle marker cartridge, said electrical actuator having a solenoid coil formed around an operative pin member which is connected to said coupling member, such that said pin member forces said fiber to protrude from said needle-like tube with ink from said ink well adhering thereto when said solenoid coil is energized;

means for mounting said electronic marker assembly onto a microscope objective, said microscope objective including a barrel as part thereof, said mounting means comprising an adapter, said adapter comprising a sleeve member adapted to releasably engage the microscope objective barrel, and a marker assembly support means associated with said sleeve member, said marker assembly support means comprising paired receiving arms extending substantially radially outward from said sleeve member to receive at least a portion of said electronic marker assembly therebetween, each of said arms defining juxtaposed receiving surfaces, each of said juxtaposed receiving surfaces defining along at least a portion thereof a carved out region for fitting said ink well snugly within said adapter, and an angled surface extending substantially radially outward from said sleeve member and disposed between said arms adapted to engage said portion of said electronic marker assembly, wherein an angled hole is defined through said angled surface to allow a portion of said electronic marker assembly to extend therethrough, and wherein said receiving surfaces and said angled surface cooperate to define a cradle-like platform for said electronic marker assembly; and electronic control means for energizing said solenoid coil when the surface of said microscope slide is desired to be marked.

2. The device as defined in claim 1, wherein said adapter is formed having threaded holes bored through its side so as to allow mounting screws to be tightened against said microscope objective barrel.

3. The device as defined in claim 2, wherein said adapter is adjustable on the barrel of said microscope objective.

4. The device as defined in claim 1, wherein said adapter is formed having a threaded hole bored through its side intersecting with said angled hole so as to allow a locking screw to be tightened against said needle-like tube.

5. The device as defined in claim 1, wherein said electronic control means is comprised of:

a power source; and switching means connected to said solenoid coil and supplied by said power source.

6. The device as defined in claim 5, wherein said power source is an AC to DC voltage plug transformer.

7. The device as defined in claim 5, wherein said switching means is comprised of a switching module having a push-button for closing an electrical circuit between said power source and said solenoid coil.

8. The device as defined in claim 5, wherein said switching means is comprised of a switching module electrically connected to a foot-switch for closing an electrical circuit between said power source and said solenoid coil.

9. An automated microscope slide marking device for making reference marks on a surface of a microscope slide, said device comprising:

an electronic marker assembly having an electrical actuator operatively engaged with a needle marker cartridge, said needle marker cartridge having a movable marking fiber integrated therein, said electrical actuator actively controlling a movement of said marking fiber;

means for mounting and positioning said electronic marker assembly on a microscope objective, said microscope objective including a barrel as part thereof, said mounting means comprising an adapter, said adapter comprising a sleeve member adapted to releasably engage the microscope objective barrel, and a marker assembly support means associated with said sleeve member, said marker assembly support means comprising paired receiving arms extending substantially radially outward from said sleeve member to receive at least a portion of said electronic marker assembly therebetween, each of said arms defining juxtaposed receiving surfaces, each of said juxtaposed receiving surfaces defining along at least a portion thereof a carved out region for fitting an ink well snugly within said adapter, and an angled surface extending substantially radially outward from said sleeve member and disposed between said arms adapted to engage said portion of said electronic marker assembly, wherein an angled hole is defined through said angled surface to allow a portion of said slide marker assembly to extend therethrough, and wherein said receiving surfaces and said angled surface cooperate to define a cradle-like platform for said slide marker assembly; and electronic control means for activating said electronic actuator when the surface of said microscope slide is desired to be marked.

10. The device as defined in claim 9, wherein said adapter is formed having threaded holes bored through its side so as to allow mounting screws to be tightened against said microscope objective barrel.

11. The device as defined in claim 10, wherein said adapter is adjustable on the barrel of said microscope objective.

12. The device as defined in claim 9, wherein said electronic control means is comprised of:

a power source; and switching means connected to said electrical actuator and supplied by said power source.

13. The device as defined in claim 12, wherein said switching means is comprised of a switching module having a push-button for closing an electrical circuit between said power source and said electrical actuator.

14. The device as defined in claim 12, wherein said switching means is comprised of a switching module electrically connected to a foot-switch for closing an electrical circuit between said power source and said electrical actuator.

15. An adapter for mounting a slide marker assembly on a microscope objective barrel comprising:

a sleeve member adapted to releasably engage the microscope objective barrel; and a marker assembly support means associated with said sleeve member, said marker assembly support means comprising:

paired receiving arms extending substantially radially outward from said sleeve member to receive at least a portion of said slide marker assembly therebetween, each of said arms defining juxtaposed receiving surfaces, each of said juxtaposed receiving surfaces defining along at least a portion thereof a carved out region for fitting an ink well snugly within said adapter; and an angled surface extending substantially radially outward from said sleeve member and disposed between said arms adapted to engage said portion of said slide marker assembly; wherein an angled hole is defined through said angled surface to allow a portion of said slide marker assembly to extend therethrough;

wherein said receiving surfaces and said angled surface cooperate to define a cradle-like platform for said slide marker assembly.

16. The adapter according to claim 15 wherein said paired receiving arms extend substantially parallel to each other.

17. The adapter according to claim 15 wherein said angled surface is substantially flat.

18. The adapter according to claim 15 further comprising a sleeve member adjustment means for releasably securing said sleeve member to said objective barrel.

19. The adapter according to claim 18 wherein said sleeve member adjustment means comprises a threaded hole defined radially through said sleeve member for allowing a screw to secure said adapter to said microscope objective barrel.

20. The adapter according to claim 15 further comprising a marker adjustment means for releasably securing said slide marker assembly within said marker assembly support means.

21. The adapter according to claim 20 wherein said marker adjustment means comprises a threaded hole defined through said adapter substantially orthogonally to said angled hole for allowing a screw to secure said slide marker assembly.

22. The adapter according to claim 15 wherein said juxtaposed receiving surfaces are disposed substantially parallel to each other.

* * * * *